D. H. SAUNDERS.
NET.
APPLICATION FILED MAY 1, 1907.
904,899.
Patented Nov. 24, 1908.
Fig. 1.
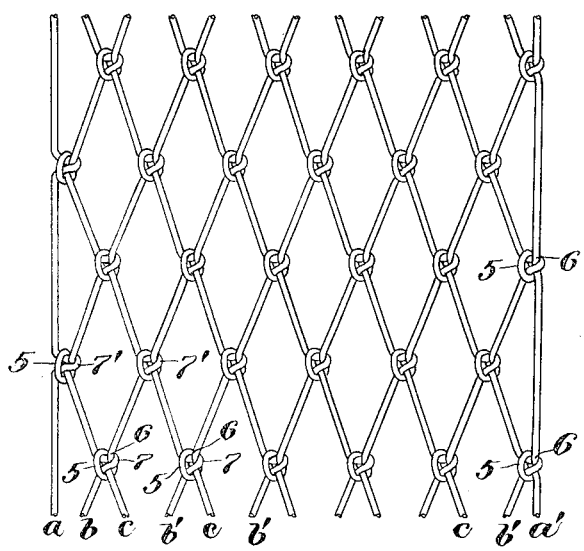
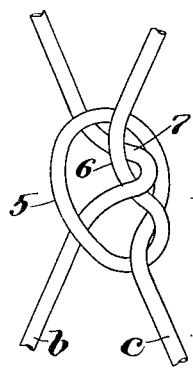
Fig. 2.
Witnesses:
H. C. Bowser.
B. L. Gilbride
Inventor:
David H. Saunders
by Henry J. Miller
Attorney.

UNITED STATES PATENT OFFICE.

DAVID H. SAUNDERS, OF GLOUCESTER, MASSACHUSETTS.

NET.

No. 904,899.  Specification of Letters Patent.  Patented Nov. 24, 1908.

Application filed May 1, 1907. Serial No. 371,269.

*To all whom it may concern:*

Be it known that I, DAVID H. SAUNDERS, of Gloucester, in the county of Essex and State of Massachusetts, have invented certain new and useful Improvements in Nets; and I hereby declare that the following is a full, clear, and exact description of the same, reference being had to the accompanying drawings, forming part of this specification.

This invention refers to improvements in nets.

One object of the invention is to so construct a net that in all the net forming knots the crosses shall be on one side of the net and the bights of all of said knots shall extend in the general direction in which the net hangs when in use whereby strain on the strands or cords of the net, when hanging from one of its borders, will tend to draw the knots tight.

Another object of the invention is to so progressively knot together a series of cords to form a net that the bights of all the cords extend laterally in the same direction through the return loops or crosses of the next adjacent cords, and that the return members of said loops shall extend through said bights.

The invention consists in the net as herein shown and described.

Figure 1, is a plan view of a portion of the net. Fig. 2, represents a similar view, on enlarged scale, of one of the knots before being drawn tight.

Similar numerals of reference designate corresponding parts throughout.

In carrying this invention into practice my main object has been to so construct nets, and particularly seine and other fishing nets, that all of the knots may extend in one direction: whereby all of the knots may be tightened by strain on the net in the direction in which the net hangs when in use without liability of upsetting the knots. Border cords are similarly knotted, at intervals, to the adjacent cords or strands of the net, the bights of one border cord extending inward, being embraced by the loops or crosses of the next adjacent cord or strand, while from the other border cords extend loops or crosses which embrace the bights of its next adjacent cord or strand.

It is to be understood that this improved net may be constructed of any desired width or length, the width depending upon the size of the mesh and the number of cords or strands $b$—$b'$—$b$ and $c$ employed between the border cords $a$ and $a'$. The method of its manufacture, commencing with the cords arranged approximately parallel is preferably as follows: The cords $c$—$c$ and $a'$, at corresponding points in their lengths are simultaneously turned back beneath themselves to form loops or crosses 5—5 the continuations of these strands after passing beneath the main portions of the strands are brought upward, portions of the others of each pair of strands $a$—$b$ and $b'$—$b'$ are now passed through the return loops 5—5 to form bights 7—7' in the nature of sheds through which the end portions 6—6 of the strands $a$—$c$—$c$ are passed, or woven; the strands are now drawn to tighten the knots and the strands $b$ and $b'$—$b'$ are then diverged to the left and return loops or crosses are formed therein through which bights, or sheds, of the strands $a$ and $c$—$c$ are passed, the ends of the strands being passed through said bights and then diverged to the right for the next knot.

It is to be noted that the border cord, or strand, $a'$ forms locking loops or crosses 5—5 and 6 only at knots which lie intermediate the points from which the bights 7'—7' of the border cord, or strand, $a$ extend, and that the strands or cords $b$—$b'$—$b'$ and $c$—$c$ form alternately, bights 7—7 and loops or crosses 5—5 in the progressive operation; and that strands $c$—$c$ and $a'$ are weaving strands in the first row of knots, shown at the lower portion of Fig. 1 of the drawing, and the cords $a$—$b$ and $b'$ form the weaving strands and the cords $c$—$c$ form the looping weaving strands in the second row of knots.

The net, particularly when used as seine, preferably hangs from one of the border cords $a$ and $a'$, to which supports may be attached, whereby the weight of the net exerts strain on the knots to tighten the same as the bights 7—7' tend constantly to draw the parts 6—6 towards the centers of the loops or crosses 5—5 and this strain, being resisted by the adjacent knots, results in the tightening of said loops 5—5 about the bights without liability of upsetting any of the knots.

The term bight is herein used to designate the bend 7 or 7' to distinguish the same from the embracing loop 5 and without the intention to thereby limit this invention specifically by the use of such term. The word side as referring to the side of the net on which the cross loops 5—5 appear is designed to distinguish the side, which in material having close mesh may be considered the surface, from the edge of the net.

What I claim is:—

1. A net formed of a series of strands knotted together at intervals and having border cords one of which has a series of bights both arms of which are crossed at one side by embracing loops of the next adjacent strand, the other of said border cords having a series of embracing cross loops which extend inward and cross both arms of the bights of its next adjacent strand at one side thereof.

2. A net formed of a series of strands knotted together at intervals each of said strands forming alternately crossing loops, which cross both arms of the bights formed in one adjacent strand at one side of said arms and embrace said arms, and bights, both arms of which extend through the crossing loops of the other of its adjacent strands, substantially as described.

3. A net formed of a series of strands knotted together at intervals each of the knots of which has an embracing loop which crosses both arms of a bight, at one side thereof, formed in the next adjacent strand, all of said cross loops being on one side of the net.

4. A net formed of a series of strands knotted together at intervals each of said knots having a bight both arms of which are crossed at one side thereof by a loop formed in the next adjacent strand, said loop strand passing through said bight, all of said bights extending in the same general direction and all of the cross loops being on one side of the net, substantially as herein shown and described.

5. A net formed of a series of strands knotted together at intervals the crossing loops of all of the knots of which are at one side of the net and the bights of all of which knots, extend in the same general direction, whereby in a longitudinal row of said knots the crossing loops are all laterally at the corresponding sides of the bights, substantially as described.

In testimony whereof I affix my signature in presence of two witnesses.

DAVID H. SAUNDERS.

Witnesses:
SAMUEL L. MERCHANT,
HENRY J. MILLER.